(12) United States Patent
Shyu et al.

(10) Patent No.: US 7,862,178 B2
(45) Date of Patent: Jan. 4, 2011

(54) SCANNING PROJECTION APPARATUS

(75) Inventors: Jyh-Horng Shyu, Hsinchu (TW); Shang-Yi Wu, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 874 days.

(21) Appl. No.: 11/760,796

(22) Filed: Jun. 11, 2007

(65) Prior Publication Data
US 2008/0024729 A1 Jan. 31, 2008

(30) Foreign Application Priority Data
Jul. 27, 2006 (TW) .............................. 95127440 A

(51) Int. Cl.
G03B 21/00 (2006.01)
(52) U.S. Cl. .............................. 353/30; 353/31; 353/48
(58) Field of Classification Search .................... 353/48, 353/49, 30, 31, 34
See application file for complete search history.

(56) References Cited

U.S. PATENT DOCUMENTS

| | | | |
|---|---|---|---|
| 4,639,224 A | 1/1987 | Maejima et al. | |
| 5,612,814 A | 3/1997 | Yang | |
| 6,307,688 B1 | 10/2001 | Merz et al. | |
| 6,690,101 B2 * | 2/2004 | Magnussen et al. | 310/328 |
| 7,118,231 B2 * | 10/2006 | Yamamoto et al. | 353/119 |
| 7,207,685 B2 * | 4/2007 | Chiu et al. | 359/849 |
| 2002/0038986 A1 * | 4/2002 | Magnussen et al. | 310/317 |
| 2006/0152930 A1 | 7/2006 | Lin et al. | |
| 2006/0262286 A1 * | 11/2006 | Yamamoto et al. | 353/119 |
| 2007/0014039 A1 * | 1/2007 | Chiu et al. | 359/849 |
| 2007/0247591 A1 * | 10/2007 | Shyu et al. | 353/33 |
| 2007/0263174 A1 * | 11/2007 | Shyu et al. | 353/34 |
| 2008/0024729 A1 * | 1/2008 | Shyu et al. | 353/31 |

FOREIGN PATENT DOCUMENTS

| | | |
|---|---|---|
| JP | 06-275497 | 9/1994 |
| JP | 10-189408 | 7/1998 |
| TW | 260752 | 10/1995 |
| TW | M275434 | 9/2005 |

OTHER PUBLICATIONS

"Office Action of Taiwan counterpart application", issued on Sep. 30, 2009, p. 1-p. 3.

* cited by examiner

Primary Examiner—John R Lee
(74) Attorney, Agent, or Firm—Jianq Chyun IP Office

(57) ABSTRACT

A projection apparatus including an actuator, a light source, and a projection lens is provided. The light source is disposed on the actuator and is capable for emitting light beams sequentially. The actuator is capable for driving the light source so as to change the transmission paths of the light beams. The projection lens is disposed on the transmission paths of the light beams. The volume of the projection apparatus can be reduced since the light source is directly disposed on the actuator.

25 Claims, 6 Drawing Sheets

US 7,862,178 B2

SCANNING PROJECTION APPARATUS

CROSS-REFERENCE TO RELATED APPLICATION

This application claims the priority benefit of Taiwan application serial no. 95127440, filed Jul. 27, 2006. All disclosure of the Taiwan application is incorporated herein by reference.

BACKGROUND OF THE INVENTION

1. Field of the Invention

The present invention relates to a projection apparatus. More particularly, the present invention relates to a structure of a scanning projection apparatus.

2. Description of Related Art

Referring to FIG. 1, a conventional scanning projection apparatus 100 includes an actuator 110, a light source 120, a projection lens 130, a collimating lens 140, and a reflector 150. The light source 120 emits different light beams 122 sequentially according to image data to be displayed. The reflector 150 is disposed on the actuator 110, and the actuator 110 is suitable for driving the reflector 150 so as to reflect the light beams 122 emitted by the light source 120 sequentially along different transmission paths. The projection lens 130 and the collimating lens 140 are disposed on the transmission paths of the light beams 122 after being reflected by the reflector 150. The collimating lens 140 is located between the actuator 110 and the projection lens 130. The light beams 122 reflected by the reflector 150 at different time are projected to different positions on the screen 200 through different paths by the projection lens 130, so as to form an image 210. In other words, the reflector 150 on the actuator 110 faces different directions at different time so that the light beams 122 are reflected by the reflector 150 along different transmission paths and projected to different positions on the screen 200 by the projection lens 130 so as to form an image 210.

For example, when the resolution of the image 210 projected by the scanning projection apparatus 100 is M×N and the refresh frequency of the image 210 is 60 Hz, the light source 120 has to sequentially emit (M×N) light beams 122 within $\frac{1}{60}$ s, and the reflector 150 on the actuator 110 has to swing at least ($\frac{1}{2}$×N) times within $\frac{1}{60}$ s. The reflector 150 on the actuator 110 faces different directions that the direction changes caused by the swing at different time within a frame time (i.e. $\frac{1}{60}$ s), thus, the (M×N) light beams 122 emitted by the light source 120 can be sequentially projected to the $1^{st}$ column $1^{st}$ row, the $1^{st}$ column $2^{nd}$ row, ..., the $N^{th}$ column $(M-1)^{th}$ row, and the $N^{th}$ column $M^{th}$ row of the image 210.

The swing frequency of the actuator 110 increases accordingly when the resolution (M×N) of the image 210 projected by the scanning projection apparatus 100 is higher. Thus, the size of the image 210 projected by the scanning projection apparatus 100 is limited considerably by the operation frequency of the actuator 110. Besides, in the conventional scanning projection apparatus 100, no device except optics elements which assist in the light beams 122 in transmission, is placed in the space between the actuator 110 (or the reflector 150) and the reflection light source 120 to avoid an effect on the transmission of the light beams 122. Accordingly, the volume of the conventional scanning projection apparatus 100 cannot be further reduced due to the space between the actuator 110 and the light source 120, and it causes problems in a layout of elements in the conventional scanning projection apparatus 100. Moreover, stray lights may be produced when the reflector 150 is reflecting the light beams 122, so that the quality of the image projected by the scanning projection apparatus 100 may be affected.

SUMMARY OF THE INVENTION

Accordingly, the present invention is directed to provide a projection apparatus to simplify the image projection process and improve the resolution of a projected image.

To achieve the aforementioned and other objectives, an embodiment of the present invention provides a projection apparatus including an actuator and a light source. The light source is disposed on the actuator and is capable for emitting light beams sequentially. The actuator is capable for driving the light source so as to change the transmission paths of the light beams.

Another embodiment of the present invention provides a projection apparatus including an actuator set and a plurality of light sources. The actuator set includes a plurality of actuators. The each light source is disposed on the corresponding actuator and is capable for emitting light beams sequentially. The actuators are capable for driving the light sources so as to change the transmission paths of the light beams.

The layout of the projection apparatus is simplified since the light source(s) is directly disposed on the actuator(s). Moreover, multiple actuators having light source are used in the present invention for projecting image, thus, the resolution and size of the projected image can be increased.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "vertical," "horizontal," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "facing," "faces" and variations thereof herein are used broadly and encompass direct and indirect facing. Accordingly, the drawings and descriptions will be regarded as illustrative in nature and not as restrictive.

Figure 2:
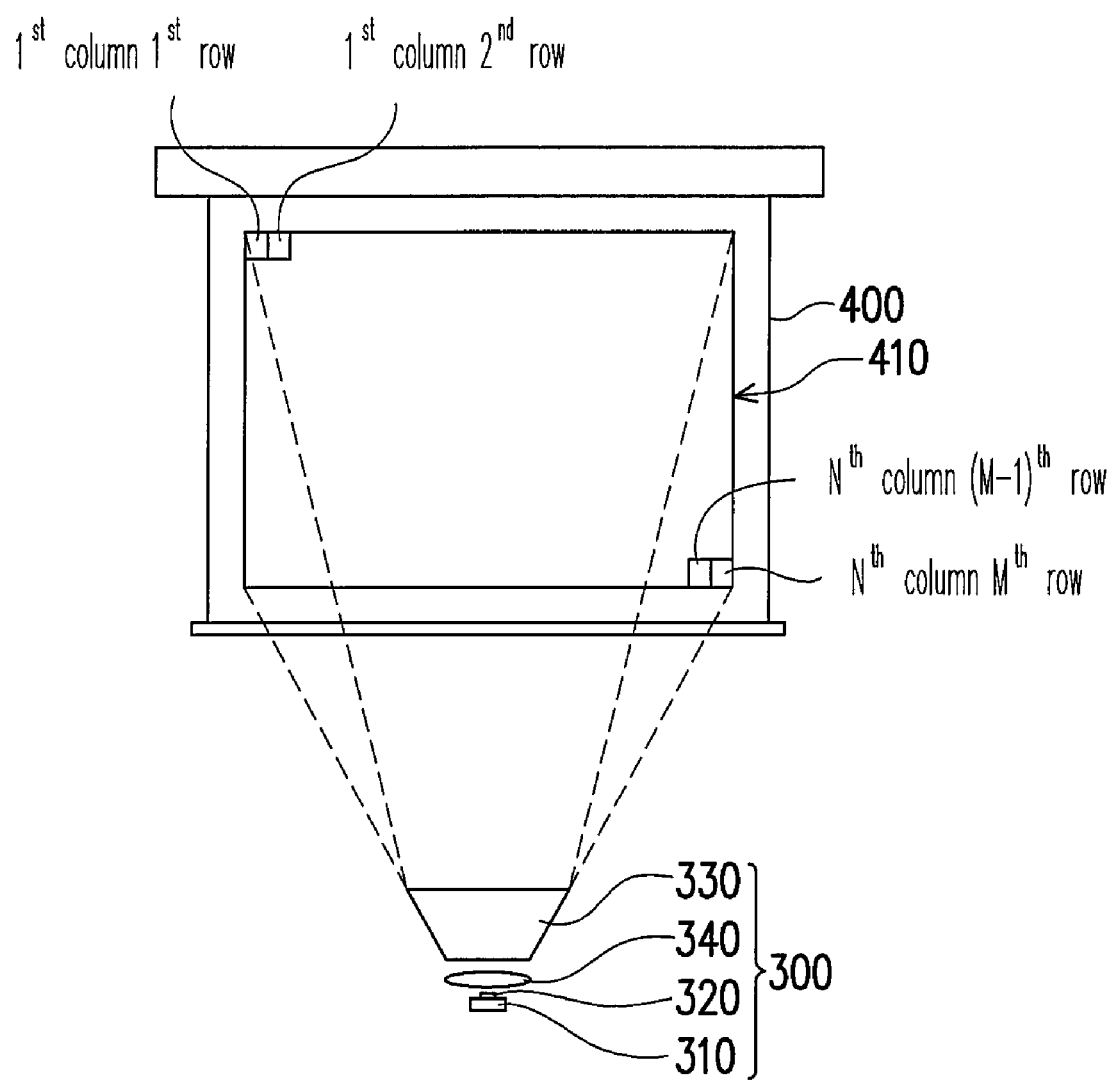
FIG. 2 is a schematic diagram illustrating a projection apparatus for projecting light beams onto a screen to produce an image according to a first embodiment of the present invention.

Referring to FIG. 2, a projection apparatus 300 in the present invention includes an actuator 310 and a light source 320. The light source 320 is disposed on the actuator 310 for sequentially emitting light beams (not shown) according to the image data. Besides, the actuator 310 is suitable for driving the light source 320 so as to change the transmission path of the light beam. In other words, the actuator 310 faces different directions at different time so that the light beam emitted by can travel along different transmission paths and projected onto different positions on a screen 400 so as to form an image 410.

For example, when the resolution of the image projected by the projection apparatus 300 is M×N and the refresh frequency of the image is 60 Hz, the light source 320 has to emit (M×N) light beams sequentially within 1/60 s, and the actuator 310 has to swing at least (½×N) times within 1/60 s. The actuator 310 faces different directions that the direction changes caused by swing at different time within a frame time (i.e. 1/60 s), so that the (M×N) light beams emitted by the light source 320 can be sequentially projected to the $1^{st}$ column $1^{st}$ row, the $1^{st}$ column $2^{nd}$ row, ..., the $N^{th}$ column $(M-1)^{th}$ row, and the $N^{th}$ column $M^{th}$ row of the image 410.

However, the present invention is not limited to the above embodiment. For example, the sequence of the light beams being projected onto the screen 400 is reversed to that in the embodiment described above. In other words, the (M×N) light beams emitted by the light source 320 are sequentially projected to the $N^{th}$ column $M^{th}$ row, the $N^{th}$ column $(M-1)^{th}$ row, ..., the $1^{st}$ column $2^{nd}$ row, and the $1^{st}$ column $1^{st}$ row of the image 410. It should be noted that here the sequence of the (M×N) light beams emitted by the light source 320 is reversed to that in the embodiment described above. Or, the (M×N) light beams emitted by the light source 320 within a frame time (i.e. 1/60 s) are projected onto the screen 400 through any non-repeated transmission paths so as to form an image 410.

In addition, referring to FIG. 2, the projection apparatus 300 further includes a projection lens 330. The projection lens 330 is located on the transmission paths of the light beams emitted by the light source 320, and the light beams are projected through the projection lens 330 to different positions on the screen 400 so as to form an image 410. Moreover, the projection apparatus 300 further includes a collimating lens 340 disposed between the projection lens 330 and the light source 320 on the transmission paths of the light beams emitted by the light source 320, and the collimating lens 340 is used for enhancing the collimation of the projected light beams.

Figure 1:
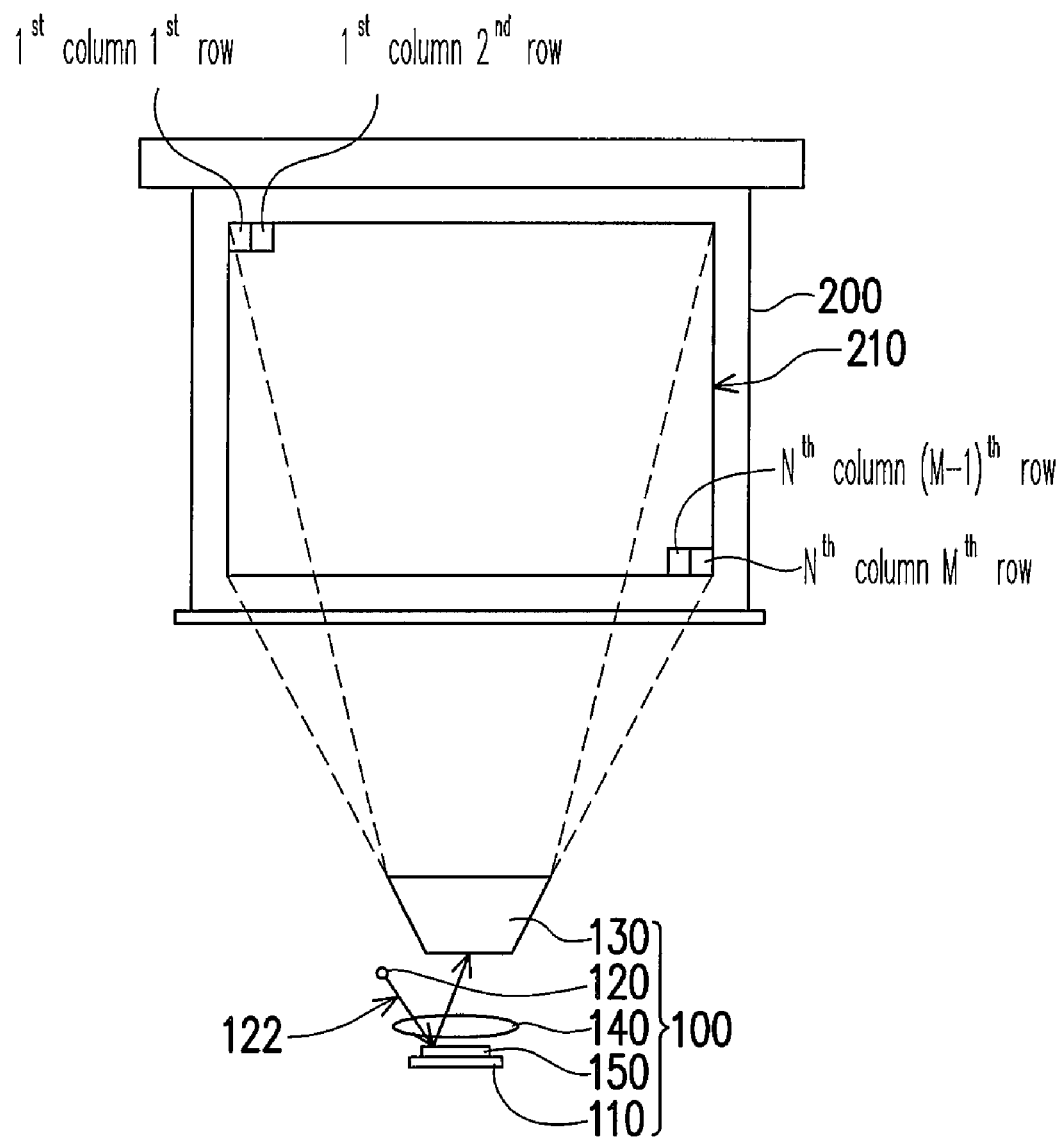
FIG. 1 is a schematic diagram illustrating a conventional scanning projection apparatus for projecting light beams onto a screen to produce an image.

Referring to FIG. 1 and FIG. 2, it should be noted that in the conventional scanning projection apparatus 100, no device except optics elements which assist in the light beams 122 in transmission, is placed in the space between the actuator 110 (or the reflector 150) and the reflection light source 120 to avoid an effect on the transmission of the light beams 122. Thus, the space between the actuator 110 and the light source 120 makes it impossible to further reduce the volume of the conventional scanning projection apparatus 100, and may cause problems in the layout of elements in the conventional scanning projection apparatus 100. However, according to the projection apparatus 300 of the present invention, the light source 320 is directly disposed on the actuator 310, thus, the volume of the projection apparatus 300 of the present invention is further reduced.

Figure 3:
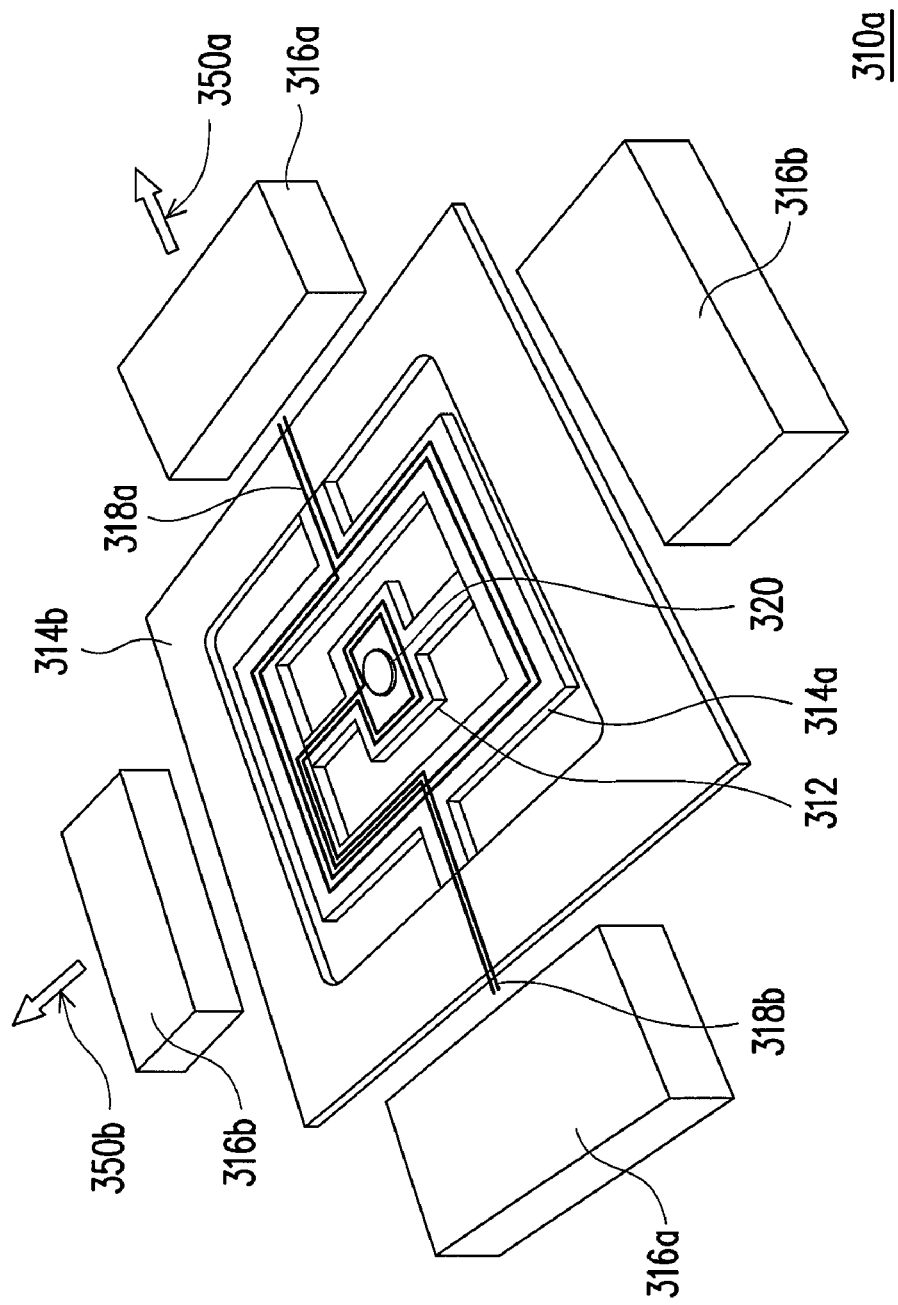
FIG. 3 is a schematic diagram of an electromagnetic inductor according to the first embodiment of the present invention.

Referring to both FIG. 2 and FIG. 3, the actuator 310 is an electromagnetic inductor 310a as shown in FIG. 3. The electromagnetic inductor 310a includes a substrate 312, a first frame 314a, a second frame 314b, a first magnetic field supplying unit 316a, a second magnetic field supplying unit 316b, and two coils 318a, 318b. The light source 320 is disposed on the substrate 312. The first frame 314a surrounds the substrate 312, and the first frame 314a is pivotally coupled to the substrate 312 so that the substrate 312 rotates relative to the first frame 314a around a first axis 350a. The second frame 314b surrounds the first frame 314a, and the second frame 314b is pivotally coupled to the first frame 314a so that the first frame 314a rotates relative to the second frame 314b around a second axis 350b. The second axis 350b is orthogonal to the first axis 350a. The first magnetic field supplying unit 316a is disposed outside of the second frame 314b for providing a first magnetic field (not shown) parallel to the second axis 350b. Similarly, the second magnetic field supplying unit 316b is disposed outside of the second frame 314b for providing a second magnetic field (not shown) parallel to the first axis 350a. Moreover, the coils 318a and 318b are disposed on the substrate 312 and the first frame 314a. In the first embodiment of the present invention, the first magnetic field supplying unit 316a and the second magnetic field supplying unit 316b are, for example, permanent magnets, electromagnets, or formed of ferromagnetic material.

When the coil 318a receives a current, according to Faraday's law, the substrate 312 is affected by the first magnetic field provided by the first magnetic field supplying unit 316a and swings an angle around the first axis 350a as its axis (not shown). Similarly, when the coil 318b receives a current, the first frame 314a is affected by the second magnetic field provided by the second magnetic field supplying unit 316b and swings an angle around the second axis 350b as its axis (not shown). Meanwhile, the swing of the first frame 314b drives the substrate 312 to swing at the same angle and in the same direction. Moreover, the light source 320 is disposed on the substrate 312, and according to Faraday's law, the swing angle of the substrate 312 can be controlled by changing the magnitude of the current. Then, the projection apparatus 300 controls the swing of the substrate 312 by changing the magnitude of the current at different time within each frame time of the image 410, so as to make the substrate 312 with different swing angles to face different directions that the direction changes caused by the swing. Accordingly, the light beams emitted sequentially by the light source 320 within each frame time of the image are sequentially projected to the corresponding positions of the image 410.

Referring to FIG. 2 again, in the projection apparatus 300, the actuator 310 is not limited to the electromagnetic inductor 310a. For example, the actuator 310 may be a voice coil motor, a piezoelectric ceramic, a DC motor, an ultrasonic motor, a stepping motor, or an electrostatic inductor.

The light source 320 in the present invention may be a light emitting diode (LED) or laser. Generally speaking, the designer can adopt different light source 320 in accordance with the specification of the projection apparatus 300 (for example, the type of images to be displayed). For example, if the projection apparatus 300 is only used for projecting single-color grey scale images, the light source 320 emitting single-color light beam, for example, white, red, green, blue, yellow, carmine, or turquoise light source, can be adopted; if the projection apparatus 300 is used for projecting colorful images, the designer can choose a plurality of light sources 320 which emit light beams of different colors and are disposed on the same substrate, or the designer can choose only one light source 320 which can emit light beams of many different colors.

Figure 4:
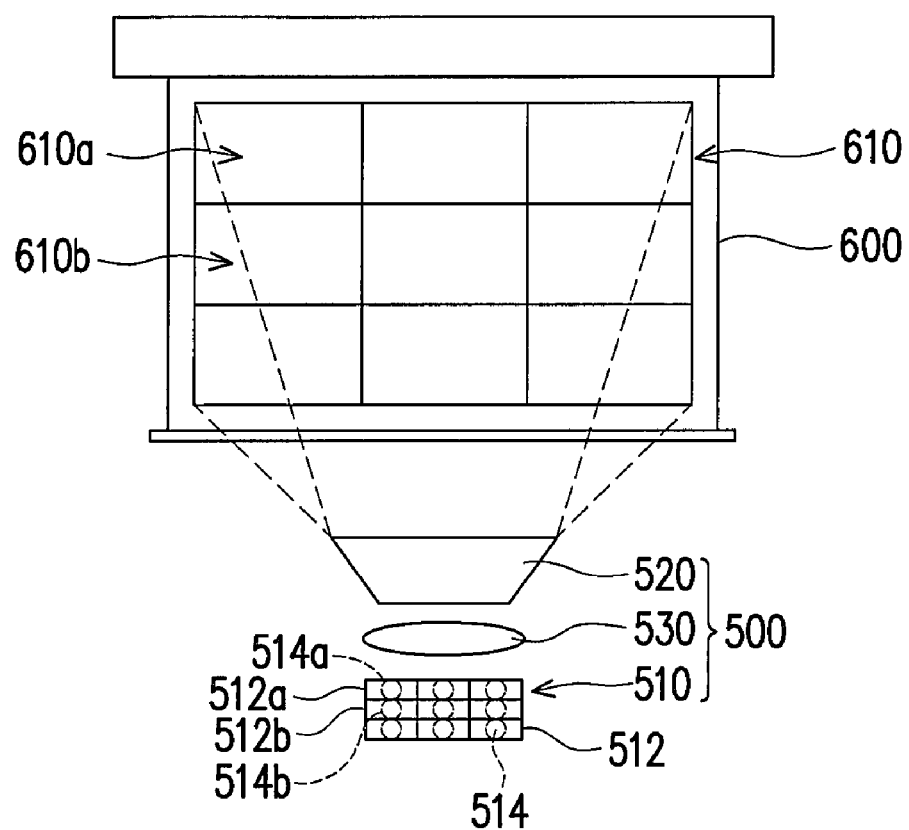
FIG. 4 is a schematic diagram illustrating a projection apparatus for projecting light beams onto a screen to produce an image according to a second embodiment of the present invention.

Referring to FIG. 4, the structure of a projection apparatus 500 is similar to that of the projection apparatus 300 in FIG. 2, except that the projection apparatus 500 includes an actuator set 510. It can be understood from FIG. 4 that the actuator set 510 is composed of a plurality of actuators 512, for example, 9 in FIG. 4 arranged in an array and a plurality of light sources 514, for example, 9 in FIG. 4 arranged in an array, wherein each of the light sources 514 is disposed on the corresponding actuator 512. The number and arrangement of the actuators 512 and the light sources 514 in FIG. 4 are not for limiting the present invention.

As shown in FIG. 4, each of the light sources 514 sequentially emits different light beams (not shown) according to the image data to be displayed, and each of the actuators 512 is suitable for driving each of the light sources 514 so as to change the transmission paths of the light beams. It should be noted that the actuators 512 are, for example, arranged as an array on the same plane, so as to form an actuator set 510. Certainly, the actuators 512 may also be arranged as an array on different planes.

The light beams emitted by various light sources 514 can be respectively projected on the corresponding areas of a screen 600 through the control of the corresponding actuators 512. Thus, the light beams emitted by the light sources 514 can be projected onto different areas on the screen 600, so as to form an image 610. For example, the light beams emitted by the first light source 514a can be projected to the first area 610a on the screen 600 through the control of the first actuator 512a. Meanwhile, the light beams emitted by the second light source 514b can be projected to the second area 610b on the screen 600 through the control of the second actuator 512b. Accordingly, the light beams emitted by various light sources 514 can be projected to different areas on the screen 600 through the control of the corresponding actuators 512, so as to provide the image 610 of large size. However, forming an image on the various areas in this embodiment is the same as that in the embodiment described above, therefore will not be described herein.

Similarly, referring to FIG. 4 again, the projection apparatus 500 may further include a projection lens 520. The projection lens 520 is located on the transmission paths of all the light beams emitted by the light sources 514, and the light beams are projected to different positions on the screen 600 through the projection lens 520 to the various areas 610a and 610b. Meanwhile, the areas 610a and 610b are arranged into an image 610. Moreover, the projection apparatus 500 may further include a collimating lens 530 disposed between the projection lens 520 and the light sources 514 and on the transmission paths of all the light beams emitted by the light sources 514, and the collimating lens 530 is used for enhancing the collimation of the projected light beams.

Referring to both FIG. 1 and FIG. 4, compared to the conventional scanning projection apparatus 100, the projection apparatus 500 in the present invention may have a plurality of actuators 512 and a plurality of corresponding light sources 514. Thus, the projection apparatus 500 can project more light beams within the same frame time, so as to increase the resolution of the image 610, without increasing the operation frequency of the actuator 512.

Figure 5:
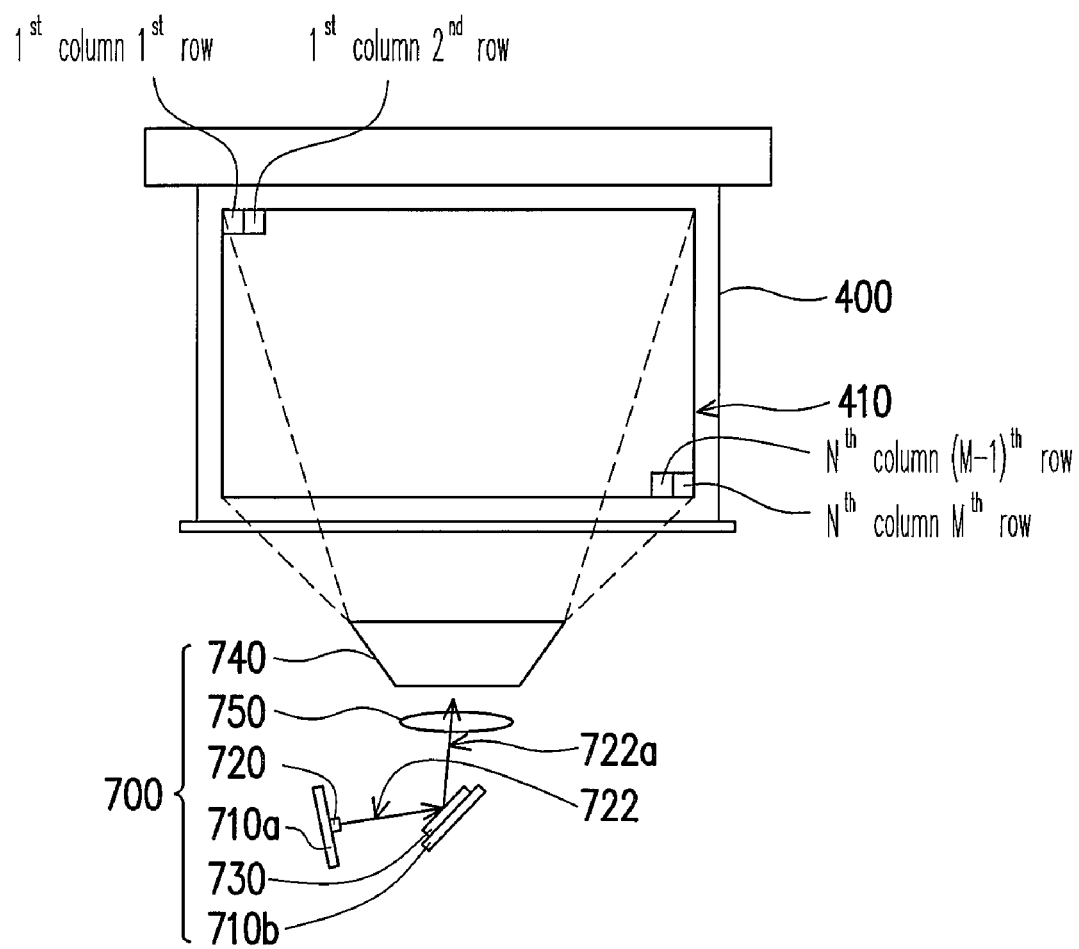
FIG. 5 is a schematic diagram illustrating a projection apparatus for projecting light beams onto a screen to produce an image according to a third embodiment of the present invention.

Referring to FIG. 5, the projection apparatus 700 includes a first actuator 710a, a light source 720, a second actuator 710b, and a reflector 730. The light source 720 is disposed on the first actuator 710a. Similarly, the light source 720 emits different light beams 722 sequentially according to the image data. Besides, the first actuator 710a is suitable for driving the light source 720 so as to change the transmission paths of the light beams 722. Moreover, the reflector 730 is disposed on the second actuator 710b, and the second actuator 710b is suitable for driving the reflector 730 to reflect the light beams 722 sequentially, so as to form reflected light beams 722a and to change the transmission paths of the reflected light beams 722a. In other words, the first actuator 710a is suitable for facing in different directions at different time so that the light beams 722 is emitted by the light source 720 along different transmission paths and can be projected to different positions on the reflector 730. Moreover, the second actuator 710b faces in different directions at different time so that the reflector 730 reflects the light beams 722 sequentially to form the reflected light beams 722a which are along different transmission paths and are projected to different positions on the screen 400 so as to form an image 410.

In the third embodiment of the present invention, the first actuator 710a, for example, drives the light source 720 so as to change the horizontal transmission paths of the light beams 722, and the second actuator 710b, for example, drives the reflector 730 so as to change the vertical transmission paths of the reflected light beams 722a. Accordingly, when the resolution of the image 410 projected by the projection apparatus 700 is M×N and the frequency rate of the image is 60 Hz, the light source 720 has to sequentially emit (M×N) light beams within 1/60 s. Besides, the light beams are sequentially projected to different positions on the screen 400 so as to form the image 410. The first actuator 710a and the second actuator 710b within a frame time (i.e. 1/60 s) are used as an example in the below to describe the situation of the light beams being projected onto the screen 400 so as to form the image 410.

First, in the first (1/N×1/60) seconds, the light source 720 sequentially emits M light beams, and the first actuator 710a swings transversely at least ½ times, the second actuator 710b remains still within the same period. Thus, the M light beams emitted by the light source 720 can be sequentially projected to the $1^{st}$ column $1^{st}$ row, the $1^{st}$ column $2^{nd}$ row, . . . , the $1^{st}$ column $(M-1)^{th}$ row, and the $1^{st}$ column $M^{th}$ row of the image 410 through the reflection of the reflector 730. Then, the second actuator 710b drives the reflector 730 to swing through an angle vertically. Similarly, in the second (1/N×1/60) seconds, the light source 720 sequentially emits M light beams; the first actuator 710a swings transversely at least ½ times, and the second actuator 710b remains still within the same period. Thus, the M light beams emitted by the light source 720 can be sequentially projected to the $2^{nd}$ column $M^{th}$ row, the $2^{nd}$ column $(M-1)^{th}$ row, . . . , the $2^{nd}$ column $2^{nd}$ row, and the $2^{nd}$ column $1^{st}$ row of the image 410 through the reflection of the reflector 730. Accordingly, in the $N^{th}$ (1/N×

1/60) seconds, the M light beams emitted by the light source 720 can be sequentially projected to the $N^{th}$ column $M^{th}$ row, the $N^{th}$ column $(M-1)^{th}$ row, ..., the $N^{th}$ column $2^{nd}$ row, and the $N^{th}$ column $1^{st}$ row of the image 410 through the reflection of the reflector 730. Thus, the (M×N) light beams emitted by the light source 720 within a frame time can be sequentially projected onto the screen 400 so as to form the image 410.

It should be noted that the foregoing embodiments are not for limiting the present invention. For example, the first actuator 710a may drive the light source 720 so as to change the vertical transmission paths of the light beams 722, and the second actuator 710b may drive the reflector 730 so as to change the horizontal transmission paths of the reflected light beams 722a.

Moreover, the projection apparatus 700 may further include a collimating lens 750 disposed between the projection lens 740 and the reflector 730 and on the transmission paths of the reflected light beams 722a, and the collimating lens 750 is used for enhancing the collimation of the projected light beams.

Figure 6:
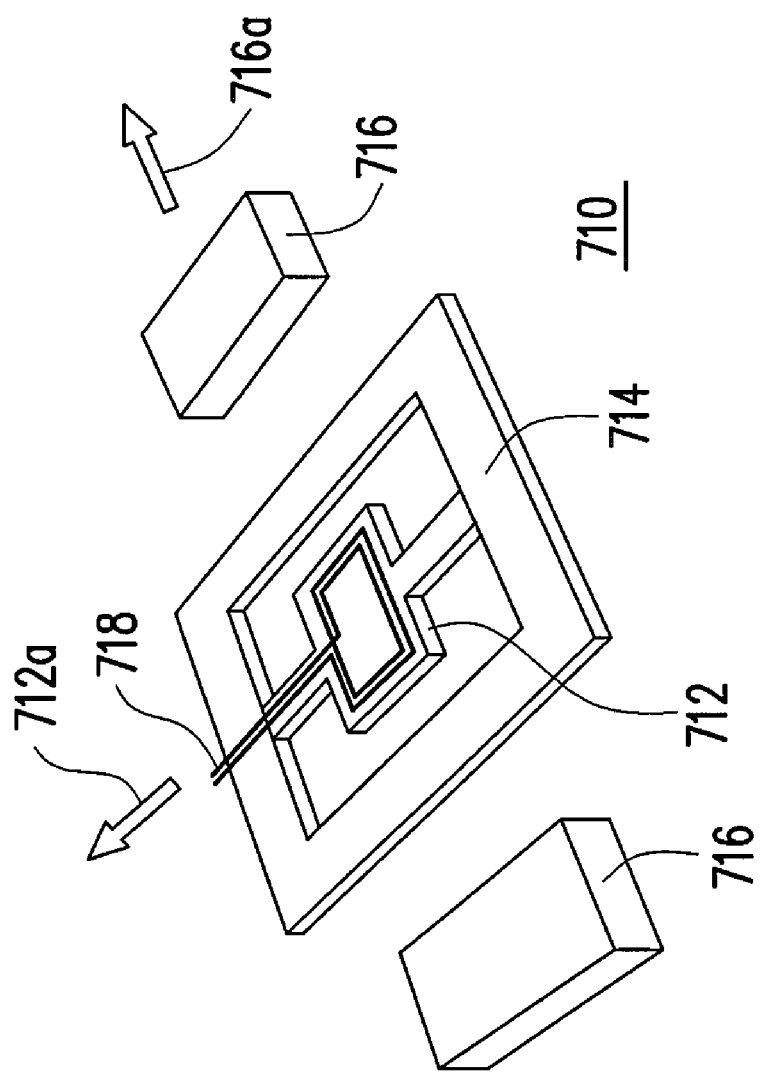
FIG. 6 is a schematic diagram of an electromagnetic inductor according to the third embodiment of the present invention.

Since two actuators 710a and 710b are used for respectively controlling the horizontal and vertical transmission paths of light beams, the structure and control method of the actuators can be simplified compared to the conventional actuator 110 which has to control light beams in both horizontal and vertical directions. Please refer to FIG. 6 for the detailed structure and control method of the first actuator 710a and the second actuator 710b. The first actuator 710a and the second actuator 710b may be an electromagnetic inductor 710 as shown in FIG. 6. It can be understood from FIG. 6 that the electromagnetic inductor 710 includes a substrate 712, a frame 714, a magnetic field supplying unit 716, and a coil 718. The frame 714 surrounds the substrate 712, and the frame 714 is pivotally coupled to the substrate 712 so that the substrate can rotate relative to the frame 714 around an axis 712a. The magnetic field supplying unit 716 is disposed outside of the frame 714 for providing a magnetic field parallel to a magnetic field direction 716a. The magnetic field direction 716a is orthogonal to the axis 712a. Besides, the coil 718 is disposed on the substrate 712.

The magnetic field supplying unit 716 is, for example, a permanent magnet, an electromagnet, or composed of ferromagnetic material. Moreover, when the coil 718 receives a current, according to Faraday's law, the substrate 712 is affected by the magnetic field provided by the magnetic field supplying unit 716 and swings through an angle about the axis 712a as its axis (not shown). Besides, the swing angle of the substrate 712 can be controlled by changing the magnitude of the current. Then, referring to FIG. 5 and FIG. 6, the projection apparatus 700 respectively controls the swing of the substrates 712 on the first actuator 710a and the second actuator 710b at different time in each frame time of the image 410 by changing the magnitude of the current, so as to make the substrates 712 face in different directions that the direction changes caused by the swing. Accordingly, the light beams 722 sequentially emitted by the light source 720 within each frame time of the image can be sequentially projected onto the reflector 730, and then are sequentially projected to the corresponding positions of the image 410 through the reflected light beams 722a reflected by the reflector 730. The first actuator 710a and the second actuator 710b are not limited to the electromagnetic inductor 710. For example, the first actuator 710a and the second actuator 710b may be a voice coil motor, a piezoelectric ceramic, a DC motor, an ultrasonic motor, a stepping motor, or an electrostatic inductor.

In overview, according to the projection apparatus of the present invention, the light source is directly disposed on the actuator, thus, the volume of the projection apparatus can be reduced. Moreover, according to the projection apparatus of the present invention, an actuator set composed of a plurality of light sources and a plurality of actuators can be adopted to project an image having high resolution and large size.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A scanning projection apparatus, comprising:
   a first actuator; and
   a light source, disposed on the first actuator, wherein the light source emits light beams sequentially according to image data to be displayed, and the first actuator drives the light source to change transmission paths of the light beams for respectively projecting the light beams onto different positions on a screen so as to form an image frame.

2. The scanning projection apparatus as claimed in claim 1, wherein the first actuator is selected from at least one of a group consisting of a voice coil motor, a piezoelectric ceramic, a DC motor, an ultrasonic motor, a stepping motor, and an electromagnetic inductor.

3. The scanning projection apparatus as claimed in claim 2, wherein the electromagnetic inductor comprises:
   a substrate;
   a first frame, surrounding the substrate, wherein the first frame is pivotally coupled to the substrate, and the substrate rotates relative to the first frame around a first axis;
   a second frame, surrounding the first frame, wherein the second frame is pivotally coupled to the first frame, the first frame rotates relative to the second frame around a second axis, and the second axis is orthogonal to the first axis;

a first magnetic field supplying unit, disposed outside of the second frame and providing a first magnetic field parallel to the second axis;

a second magnetic field supplying unit, disposed outside of the second frame and providing a second magnetic field parallel to the first axis; and a coil, disposed on the substrate and the first frame.

4. The scanning projection apparatus as claimed in claim 1, wherein the first actuator drives the light source to rotate around a first axis or a second axis, the first axis is orthogonal to the second axis.

5. The scanning projection apparatus as claimed in claim 1, wherein the light source comprises at least one laser.

6. The scanning projection apparatus as claimed in claim 1, wherein the light source comprises at least one light emitting diode (LED).

7. The scanning projection apparatus as claimed in claim 6, wherein the LED comprises one of red LED, green LED, blue LED, yellow LED, carmine LED, and turquoise LED.

8. The scanning projection apparatus as claimed in claim 1, further comprising a projection lens disposed on the transmission paths of the light beams.

9. The scanning projection apparatus as claimed in claim 8, further comprising a collimating lens disposed between the projection lens and the first actuator and on the transmission paths of the light beams.

10. The scanning projection apparatus as claimed in claim 1, further comprising a second actuator; and a reflector disposed on the second actuator, wherein the second actuator drives the reflector to reflect the light beams sequentially, to change the transmission paths of the light beams.

11. The scanning projection apparatus as claimed in claim 10, wherein the second actuator is selected from at least one of a group consisting of a voice coil motor, a piezoelectric ceramic, a DC motor, an ultrasonic motor, a stepping motor, and an electromagnetic inductor.

12. The scanning projection apparatus as claimed in claim 11, wherein the electromagnetic inductor comprises:

a substrate;

a frame, surrounding the substrate, wherein the frame is pivotally coupled to the substrate, and the substrate rotates relative to the frame around an axis;

a magnetic field supplying unit, disposed outside of the frame and providing a magnetic field parallel to a magnetic field direction, wherein the magnetic field direction is orthogonal to the axis; and a coil, disposed on the substrate.

13. The scanning projection apparatus as claimed in claim 10, wherein the first actuator drives the light source to rotate around a first axis, the second actuator drives the reflector to rotate around a second axis, and the first axis is orthogonal to the second axis.

14. A scanning projection apparatus, comprising:

an actuator set, comprising a plurality of actuators; and a plurality of light sources, respectively disposed on the actuators, wherein each light source emits light beams sequentially according to image data to be displayed, and the corresponding actuator drives the light source to change transmission paths of the light beams for respectively projecting the light beams onto different positions on a screen so as to form a portion of an image frame, and the portions of the image frame caused by the plurality of the light sources form the image frame.

15. The scanning projection apparatus as claimed in claim 14, wherein each of the actuators is selected from at least one of a group consisting of a voice coil motor, a piezoelectric ceramic, a DC motor, an ultrasonic motor, a stepping motor, and an electromagnetic inductor.

16. The scanning projection apparatus as claimed in claim 15, wherein the electromagnetic inductor comprises:

a substrate;

a first frame, surrounding the substrate, wherein the first frame is pivotally coupled to the substrate, and the substrate rotates relative to the first frame around a first axis;

a second frame, surrounding the first frame, wherein the second frame is pivotally coupled to the first frame, the first frame rotates relative to the second frame around a second axis, and the second axis is orthogonal to the first axis;

a first magnetic field supplying unit, disposed outside of the second frame and providing a first magnetic field parallel to the second axis;

a second magnetic field supplying unit, disposed outside of the second frame and providing a second magnetic field parallel to the first axis; and a coil, disposed on the substrate and the first frame.

17. The scanning projection apparatus as claimed in claim 14, wherein each of the actuators drives the corresponding light source to rotate around the first axis or around the second axis, and the first axis is orthogonal to the second axis.

18. The scanning projection apparatus as claimed in claim 14, wherein the actuators are arranged in an array.

19. The scanning projection apparatus as claimed in claim 18, wherein the actuators are located on the same plane.

20. The scanning projection apparatus as claimed in claim 18, wherein the actuators are located on different planes.

21. The scanning projection apparatus as claimed in claim 14, wherein the light sources comprise at least one laser.

22. The scanning projection apparatus as claimed in claim 14, wherein the light sources comprise at least one LED.

23. The scanning projection apparatus as claimed in claim 22, wherein the LED is selected from at least one of a group consisting of red LED, green LED, blue LED, yellow LED, carmine LED, and turquoise LED.

24. The scanning projection apparatus as claimed in claim 14, further comprising a projection lens disposed on the transmission paths of the light beams.

25. The scanning projection apparatus as claimed in claim 24 further comprising a collimating lens disposed between the projection lens and the actuators on the transmission paths of the light beams.

* * * * *